(12) United States Patent
Curatola et al.

(10) Patent No.: US 11,865,954 B2
(45) Date of Patent: Jan. 9, 2024

(54) MOTOR VEHICLE SEAT

(71) Applicant: FERRARI S.p.A., Modena (IT)

(72) Inventors: Rubens Curatola, Modena (IT); Salvatore Sedda, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/747,216

(22) Filed: May 18, 2022

(65) Prior Publication Data
US 2023/0012605 A1   Jan. 19, 2023

(30) Foreign Application Priority Data

Jul. 16, 2021   (IT) .................... 102021000018917

(51) Int. Cl.
*B60N 2/30* (2006.01)
*B60J 7/22* (2006.01)

(52) U.S. Cl.
CPC ............ *B60N 2/3015* (2013.01); *B60J 7/223* (2013.01)

(58) Field of Classification Search
CPC ............ B60N 2/206; B60N 2002/0216; B60N 2/3013; B60N 2/3015; B60N 2/879; B60J 7/223

See application file for complete search history.

(56) References Cited

U.S. PATENT DOCUMENTS

| | | | |
|---|---|---|---|
| 3,807,790 A * | 4/1974 | Erard ...................... | B60N 2/36 297/331 |
| 8,979,187 B2 * | 3/2015 | Bernhard ............. | B60N 2/3031 297/118 |
| 2012/0193949 A1 | 8/2012 | Bernhard et al. | |

FOREIGN PATENT DOCUMENTS

| FR | 2926253 A1 * | 7/2009 | ............. B60J 7/223 |
|---|---|---|---|
| FR | 2926253 A1 | 7/2009 | |

OTHER PUBLICATIONS

Search Report for Italian Application No. 102021000018917, completed Mar. 21, 2022, 7 pages.

\* cited by examiner

*Primary Examiner* — Milton Nelson, Jr.
(74) *Attorney, Agent, or Firm* — CANTOR COLBURN LLP

(57) ABSTRACT

A motor vehicle seat includes a backrest portion, a first body, a second body and a mechanism configured to coupled the backrest portion to the first body in a movable manner between a first position, in which the backrest portion is arranged between the first and the second body, the latter defining a base extending crosswise to the backrest portion in order to support a passenger seating with the back resting against the backrest portion on a first surface of the backrest portion, and a second position, in which the backrest portion has a second surface opposite the first surface and facing the second body; wherein the first surface, in the second position of the backrest portion, defines a wind deflector.

9 Claims, 2 Drawing Sheets

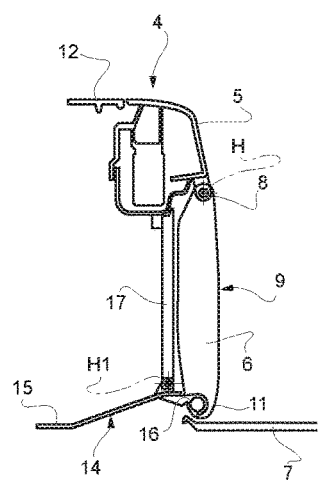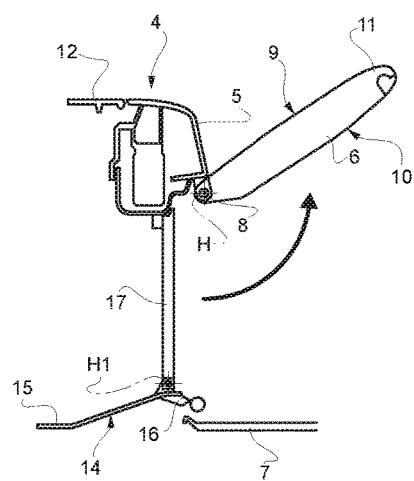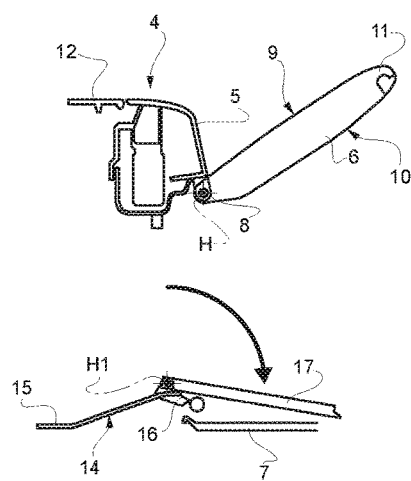

MOTOR VEHICLE SEAT

CROSS-REFERENCE TO RELATED APPLICATIONS

This patent application claims priority from Italian patent application no. 102021000018917 filed on Jul. 16, 2021, the entire disclosure of which is incorporated herein by reference.

TECHNICAL FIELD

The invention relates to a seat for a motor vehicle, in particular a convertible one.

PRIOR ART

Convertible motor vehicles notoriously suffer, in the configuration with open roof, from the annoying presence of air draughts and whirlwinds inside the passenger compartment.

The aforesaid undesired phenomenon is further worsened when the motor vehicle travels at relatively high speeds, for example along suburban paths or on a motorway.

In order to counter this phenomenon, the use of a suitable wind deflector is known, which is mounted on the rear body in a position at the back of the passenger compartment and with a vertical orientation or anyway transverse to the ground.

The wind deflector is removable for those cases in which its use is not necessary; therefore, the vehicle is typically provided with a storage compartment designed to easily accommodate the wind deflector, which was removed and—if necessary—folded onto itself, in case of a pliable wind deflector.

Generally speaking, an improvement of the state of the art in the automotive industry is needed, specifically for convertible motor vehicles.

More in particular, the free spaces of the motor vehicle need to be redistributed, assigning at least part of the space needed to accommodate the wind deflector to other uses or, simply, to an increase in the passengers' comfort in the passenger compartment.

Furthermore, the operations to be carried out to install and position the wind deflector, when it needs to be used, and to remove and store the wind deflector, when the use thereof is no longer needed, need to become easier.

The object of the invention is to fulfil at least one of the needs discussed above, preferably in a simple and effective fashion.

DESCRIPTION OF THE INVENTION

Said object is reached by a motor vehicle seat as defined in claim 1.

The dependent claims define particular embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein:

FIG. 2 is a side view, with parts removed for greater clarity, of the seat of FIG. 1, and FIGS. 3 and 4 are similar to FIG. 1 and show the seat in two respective operating conditions distinct from the one of FIG. 2.

EMBODIMENTS OF THE INVENTION

Figure 1:
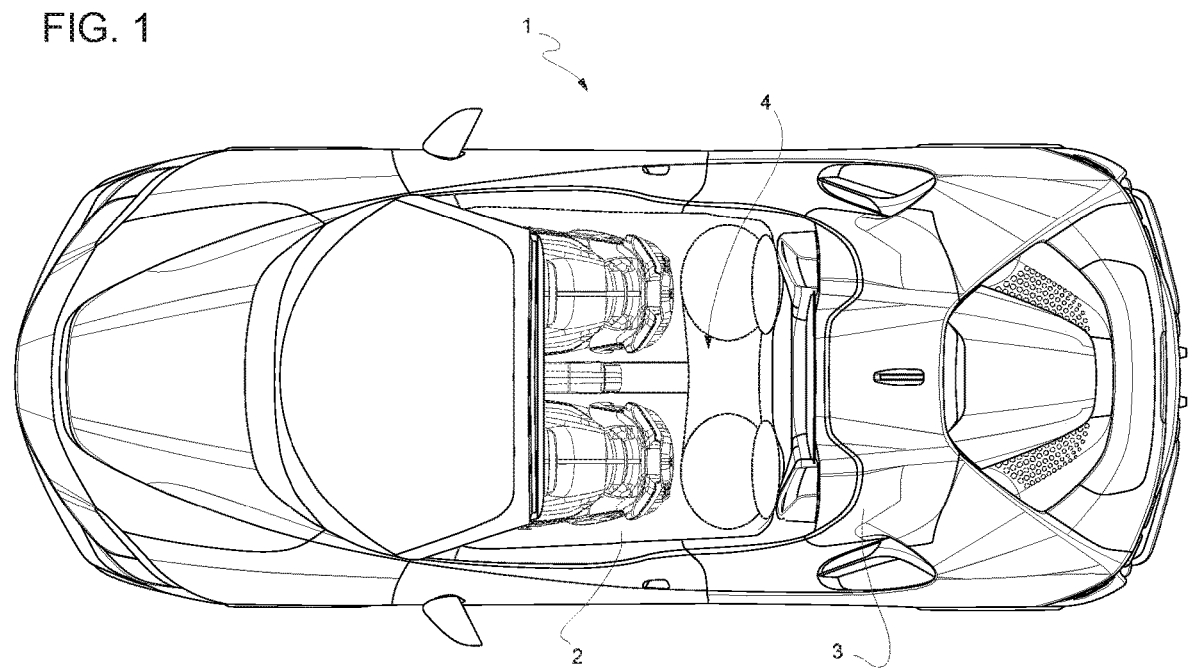
FIG. 1 is a plan view of a convertible motor vehicle comprising a motor vehicle seat according to an embodiment of the invention.

In FIG. 1, reference number 1 is used to indicate, as a whole, a motor vehicle. More precisely, the motor vehicle 1 is a convertible motor vehicle.

Hence, the motor vehicle 1 comprises a passenger compartment 2 and a roof 3, which can be configured between an open configuration, in which the passenger compartment 2 is open to the outside, and a closed configuration to close the passenger compartment 2, in particular when all the other openings of the motor vehicle 1 are closed (for instance, windows, openings of the doors or of the trunk).

According to an alternative, the passenger compartment 2 could always be open to the outside; in other words, the motor vehicle 1 could lack the roof 3.

Furthermore, the motor vehicle 1 comprises a seat 4, in particular a rear seat, more in particular a bench seat.

The seat 4 comprises a plurality of bodies or portions 5, 6, 7, the portion 6 defining at least a backrest portion, specifically the entire backrest.

The portions 5 and 7 may, for example, be fixed; more in particular, the portion 5 defines a headrest.

The portion 7 extends along the forward moving direction of the motor vehicle 1, namely along a horizontal direction, thus defining a base of the seat 4 suitable for supporting the legs of a passenger seating on the seat 4.

Furthermore, the seat 4 comprises a mechanism 8 configured to couple the portion 6 to the portion 5 in a movable manner between a first and a second position.

In the first position, shown in FIG. 2, the portion 6 is arranged between the portions 5, 7 and is transversal to the portion 7, more precisely approximately orthogonal. In other words, the portion 6 extends in a substantially vertical manner in the first position. In this position, the seat 4 is suitable for supporting the passenger seating with the lower limbs resting against the portion 7 and the back resting against the portion 6 in the area of a surface 9 of the portion 6 itself.

In the second position, the portion 6 extends along the horizontal direction above the portion 7. In other words, the portion 6 has a surface 10 opposite the surface 9 and facing the portion 7.

In the second position, shown in FIG. 3, the portion 6 becomes a wind deflector, at least when the roof 3 is in the open configuration. Namely, the portion 6 deflects an air flow directed towards the passenger compartment 2 towards the outside. More precisely, the air flow starts from a rear area of the motor vehicle 1 towards the passenger compartment 2. Here, the air flow meets the portion 6 in the second position brushing the surface 9, which is designed to support the back of the passenger in the first position.

In particular, the portion 6, in the second position, is tilted upwards relative to the horizontal direction, more in particular at an acute angle. In the embodiment shown in FIG. 3, an end 11 of the portion 6, more distant from the portion 5, reaches a height equal to or greater than the higher end 12 of the portion 5.

More in detail, the mechanism 8 consists of a hinge, so that the portion 6 is hinged to the first body 5 in a rotary manner in order to rotate around an axis H between the first and the second position. In particular, the axis H is horizontal and orthogonal to the forward moving direction of the motor vehicle 1.

Preferably, the mechanism 8 is manually operated. Alternatively, the mechanism 8 could also be electrically operated.

Furthermore, the seat 4 comprises a frame portion 14. In the first position, the portion 6 is arranged between the end 11 and an end 15 of the frame portion 14.

In other words, the frame portion 14 extends behind the seat 4 and, hence, behind the portion 6, both in the first and in the second position. Namely, the frame portion 14 extends on the opposite side of the portion 7 relative to the portion 6 in the first position.

Preferably, the seat 4 comprises a locking device 16, which is configured to fix the portion 6 to the frame portion 14 with the portion 6 in the first position. For example, the locking device 16 can be closed in a snapping manner and be released by hand, for instance through a lever or a button or through a key. Alternatively, the locking device 16 can be closed by hand, as well. Possibly, the closing and/or the opening of the locking device 16 can be electrically operated.

More preferably, the seat 4 further comprises a dividing wall 17 coupled to at least one of the portion 5 and the frame portion 14 in a movable manner between a separation position and a communication position.

In the separation position, shown in FIG. 3, the dividing wall 17 is arranged between the portion 5 and the frame portion 14. More in detail, the dividing wall 17 is arranged behind the portion 6 in the first position. In this position, the dividing wall 17 separates a space ahead or in front of the seat 4 from a space at the back of the seat 4, for example defined by a trunk of the motor vehicle 1. In particular, the dividing wall 17 extends in a substantially vertical manner from the point in which it rests against the portion 5 up to the point in which it is coupled to the frame portion 14. The latter defines at least one wall of the trunk.

In the communication position, shown in FIG. 4, the dividing wall 17 frees a space between the portion 5 and the frame portion 14, such as to allow objects to be moved from the front of the seat 4 to the back thereof, at least when the portion 6 is in the second position.

Specifically, the dividing wall 17 is coupled to the frame portion 14, in particular is hinged to the latter in a rotary manner around a horizontal axis H1 orthogonal to the forward moving direction of the motor vehicle 1, and rests against the portion 5 in the separation position.

For example, in the communication position, the dividing wall 17 can be arranged on the portion 7. Here, in particular, the dividing wall 17 faces the surface 10, when the portion 6 is in the second position. More in particular, the dividing plate 17 is arranged between the portions 6, 7.

Alternatively, in the communication position, the dividing wall 17 could rest on the portion 14.

In other words, the dividing wall 17 could be rotated in a clockwise or counterclockwise direction.

Furthermore, the dividing wall 17, in the separation position, faces the surface 10 with the portion 6 in the first position.

Owing to the above, the advantages of the seat 4 according to the invention are evident.

The seat 4 is multiuse, in that it can be used both as a seat and as a wind deflector; in this way, no removable wind deflector is needed and no storage compartment is needed to accommodate the wind deflector when it is not used. This corresponds to significant reduction in the space taken up in the motor vehicle 1.

Furthermore, the use of the seat 4 as wind deflector is extremely simple. Users only have to handle the portion 6, for example releasing the locking device 16 and moving the portion 6 to the second position. Here, users can fix the second position of the portion 6 to a component of the motor vehicle 1, for example through a further locking device which is not shown herein.

Furthermore, the handling of the portion 6 also allows for a communication between the front of the seat 4 and the back thereof in a simple fashion. In this way, the space of the trunk can be increased, for example in order to introduce large-sized objects and retrieve or store objects starting from the passenger compartment 2.

The dividing wall 17 allows users to choose whether to maintain the communication between front and back or the seat 4 or not, depending on the needs, in a simple fashion.

Finally, the seat 4 according to the invention can be subjected to changes and variants, which, though, do not go beyond the scope of protection set forth in the appended claims.

The invention claimed is:

1. A motor vehicle seat comprising a backrest portion, a first body, a second body and a mechanism configured to couple the backrest portion to the first body in a movable manner between a first position, in which the backrest portion is arranged between the first and the second body, the latter defining here a base extending crosswise to the backrest portion to support a passenger seating with the back resting against the backrest portion on a first surface of the backrest portion, and a second position, in which the backrest portion has a second surface opposite the first surface and facing the second body; wherein the first surface, in the second position of the backrest portion, defines a wind deflector;
a frame portion, whereby the backrest portion, in the first position, is arranged between respective ends of the second body and of the frame portion; and
a dividing wall, which is coupled to at least one of the first body and the frame portion in a movable manner between a separation position, in which the dividing wall is arranged between the first body and the frame portion to separate a front of the seat from a back of the seat, and a communication position, in which the dividing wall frees a space between the first body and the frame portion such as to allow objects to be moved from the front of the seat to the back of the seat and vice versa.

2. The seat according to claim 1, wherein the mechanism consists of a hinge, so that the backrest portion is hinged to the first body in a rotary manner in order to rotate around an axis between the first and the second position.

3. The seat according to claim 1 and comprising a headrest defining the first body.

4. The seat according to claim 1 and comprising a locking device, which is configured to fix the backrest portion to the frame portion with the backrest portion in the first position.

5. The seat according to claim 1, wherein the dividing wall, in the separation position, faces the second surface with the backrest portion in the first position.

6. The seat according to claim 1, wherein the dividing wall is hinged to the frame portion in a rotary manner about a further axis between the separation position and the communication position.

7. A motor vehicle comprising a seat according to claim 1.

8. The motor vehicle according to claim 7, wherein the motor vehicle is convertible and comprises:
   a. a passenger compartment, and
   b. a roof, which can be configured between an open configuration, in which the passenger compartment is open to the outside, and a closed configuration to close the passenger compartment,
   wherein said wind deflector is configured to deflect an air flow directed towards the passenger compartment towards the outside when the roof is in the open configuration.

9. Use of a seat according to claim 1 as wind deflector in a motor vehicle according to claim 7.

* * * * *